J. H. HOLMGREEN.
SILO.
APPLICATION FILED MAR. 1, 1916.

1,275,558.

Patented Aug. 13, 1918.
7 SHEETS—SHEET 1.

Fig. 1.

Witness
Edwin L. Jewell

Inventor
Julius H. Holmgreen
Grant Burroughs Attorney

J. H. HOLMGREEN.
SILO.
APPLICATION FILED MAR. 1, 1916.

1,275,558.

Patented Aug. 13, 1918.
7 SHEETS—SHEET 6.

UNITED STATES PATENT OFFICE.

JULIUS H. HOLMGREEN, OF SAN ANTONIO, TEXAS.

SILO.

1,275,558. Specification of Letters Patent. Patented Aug. 13, 1918.

Application filed March 1, 1916. Serial No. 81,444.

*To all whom it may concern:*

Be it known that I, JULIUS H. HOLMGREEN, a citizen of the United States, and a resident of San Antonio, in the county of Bexar and State of Texas, have made certain new and useful Improvements in Silos, of which the following is a description.

Silos, as ordinarily constructed in the preferred form, comprise a cylindrical wall provided with a roof and a closed bottom, made as nearly airtight as possible. Into this shell the silage, formed of chopped green fodder, is tightly packed; and by the exclusion of air the material is preserved so that it practically remains in the same condition as when introduced into the silo. After a silo has been packed the silage gradually settles to a considerable extent and leaves a vacancy in the upper part of the silo. To prevent the top of the mass from becoming exposed to the air, a thick layer of straw and chaff is spread over the same. Should any part of the silage be exposed to the air, in a few hours it spoils so as to be unfit for stock-feeding purposes.

In removing the silage from the ordinary silo for stock-feeding purposes, the usual practice is to start at the top of the mass and work downward. Before this can be done the protecting layer of straw and chaff must be removed, and should be replaced after each withdrawal of the silage to protect the newly exposed material. In practice, however, the replacing of the protecting layer of straw and chaff is often neglected and the exposed silage becomes spoiled. The spoiled material is not only wasted, but should it be accidentally fed to the stock the latter are likely to be poisoned. To facilitate the extraction of the silage from the ordinary silo, the latter is usually provided with a number of doors, or windows, arranged at different levels. The installation of these doors is not only costly, but the cutting of the wall to accommodate the doors so weakens the wall as to require additional reinforcing means, which also increases the cost of construction. Furthermore, it is difficult to make these doors airtight; consequently, the silage stored adjacent to the doors is apt to spoil through the access of air.

The present invention has for its object the provision of an extractor whereby the material can be removed as desired for feeding purposes without exposing any fresh material of the remaining mass to the action of the air. This is done by discharging the material from the bottom of the mass in such a way that there can be no exposure of the cut made into the bulk by the separation of the part required for feeding purposes.

In carrying out the invention the shell of the silo is constructed in the usual way, except that there are no doors or windows in the wall. By the elimination of the doors and windows, not only is there a saving in the cost of construction, but also there can be no spoiling of material through the admission of air through door-openings in the wall. The silo of the present invention is provided with a central opening in its floor through which the silage is discharged from the bottom of the mass, and from which opening the material is conveyed beneath the floor to the exterior of the silo. An extractor is provided that travels over the floor of the silo and cuts away the bottom layer of the mass of silage and propels it to the central discharge opening. As the material is removed the remaining mass settles to the floor and is always in position to be engaged by the extractor. By the employment of such means, after the silage is once packed in the silo and covered with the protecting layer of straw and chaff, there can be no exposure to the air of the material from the time it is packed until its discharge, and in consequence the withdrawn silage will always be in good condition for feeding purposes.

The means employed for carrying out the invention consist in the novel construction, combination and arrangement of parts hereinafter described, pointed out in the appended claims, and illustrated by the accompanying drawings.

In the drawings, in which similar parts are designated by corresponding reference characters.

Fig. 2 is a plan view of the same.

Figure 1:
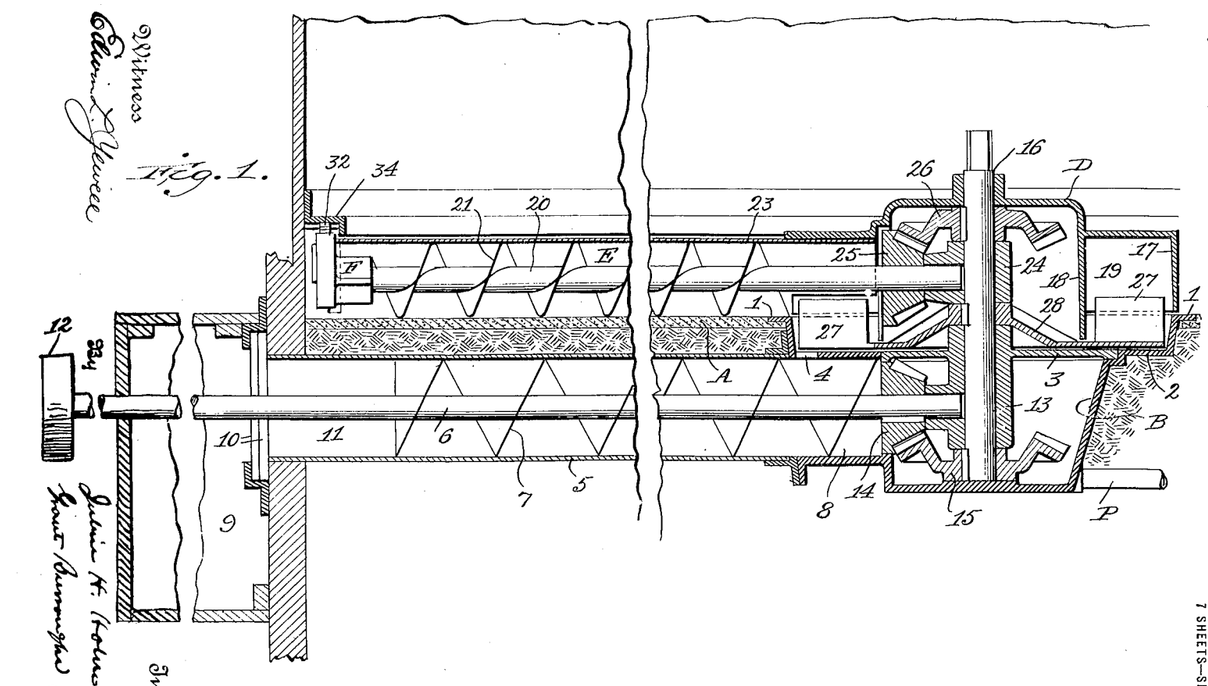
Figure 1 is a vertical sectional view through the lower part of the silo and the silage extractor mounted therein, showing the preferred embodiment of the invention.

The silo, of which only a part of the side wall and floor is shown, is of the usual cylindrical formation. Beneath the center of the floor A is seated the hollow casting B of a dish-shape formation with its flanged upper edge 1 flush with the floor. In the side wall of the casting is the annular horizontal part 2 forming the bottom of a shallow receiving trough. Seated in the casting is the circular plate 3 flush with the horizontal part 2. At one side of the casting the horizontal part 2 and the plate 3 are cut away to form the discharge opening 4 into the fixed conveyer C mounted beneath the floor A and leading to the exterior of the silo.

The fixed conveyer C is of the screw-type, comprising the tube 5, the shaft 6 and the screw 7. The inner end of the tube 5 communicates with the chamber 8 in the casting B directly beneath the opening 4. The outer end of the tube 5 passes through the wall of the cylinder and empties into the receptacle 9. The outlet of the tube into the receptacle is provided with the doors 10. The screw 7 does not continue to the outer end of the tube, but leaves a space or chamber 11 therein, the purpose of which will be explained farther on. The outer end of the shaft 6 extends through the receptacle 9 and carries the pulley 12, so that a belt can be used to drive the shaft. The inner end of the shaft is journaled in a bearing in the side of the stub 13 integral with the plate 3 secured in the casting B. Splined on the inner end of the shaft 6 is the bevel-gear 14 meshing with a similar gear 15 splined on the lower end of the vertical shaft 16 journaled in the stub 13.

Journaled on the upper end of the vertical shaft 16 is the upper hollow casting D rotatable on and supplemental to the lower casting B. The upper casting D has an outer depending flange 17 that travels along the flanged upper edge 1 of the lower casting, and also an inner depending flange 18 that travels above the plate 3 of the lower casting. Between the flanges 17 and 18 is the annular chamber 19 that forms a communication between the inner end of the traveling conveyer E and the discharge opening 4 into the inner end of the fixed conveyer C. It is to be observed that the chamber 19 is always in communication with the inner end of the fixed conveyer irrespective of the position of the traveling conveyer.

Figures 5, 6, 7:
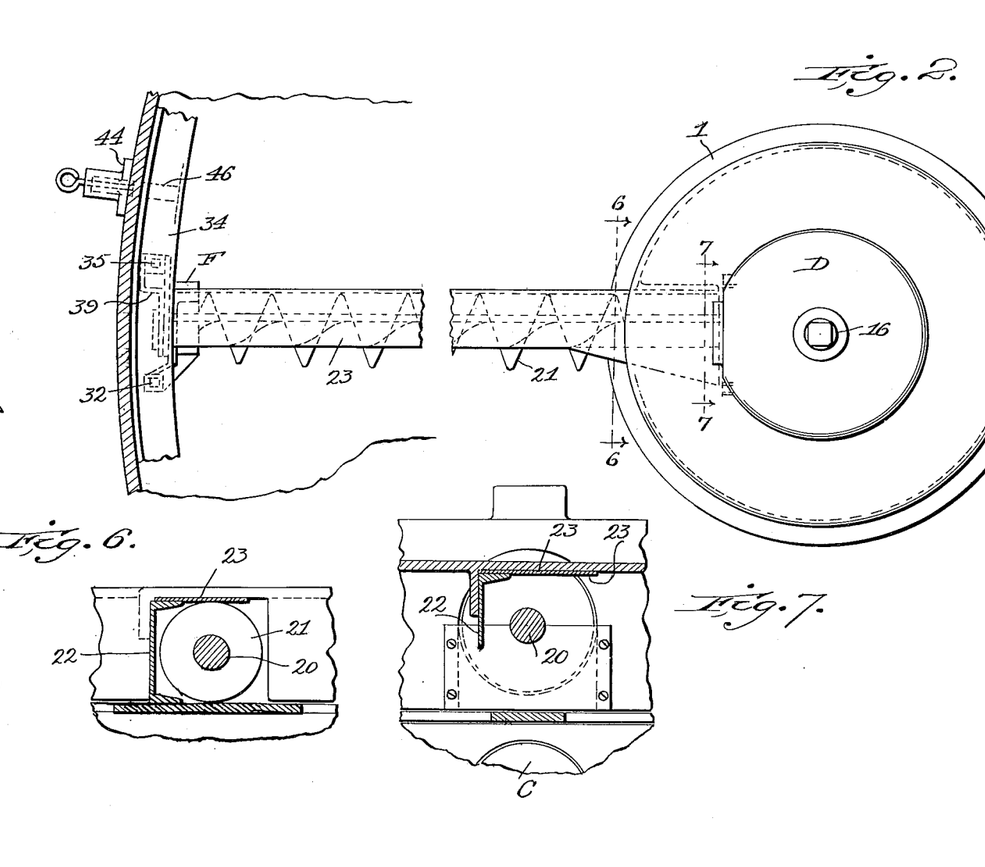
Fig. 6 is a cross-sectional view of the traveling conveyer, on the line 6—6 of Fig. 2.
Fig. 7 is a similar view on the line 7—7 of Fig. 2.

The traveling conveyer E is also of the screw type, and comprises the shaft 20, the screw 21 carried by the shaft, and a casing or housing extending over the screw consisting of the back plate 22 flanged at its upper and lower edges (Fig. 6), and the top plate 23 secured on the upper flange of the back plate. The inner end of this casing is secured in the upper hollow casting D and opens into the annular chamber 19 of said casting. The inner end of the shaft 20 is journaled in the bearing block 24 journaled on the vertical shaft or spindle 16. Splined on the inner end of the shaft 20 is the bevel-gear 25 meshing with the similar gear 26 splined on the upper end of the spindle 16. Through the gears 25, 26 rotation of the spindle 16 is communicated to the shaft 20 and the screw 21. Rotatable in the annular chamber 19 of the casting D are the vane-scrapers 27 carried by the spider 28 splined on the spindle 16. The vanes traveling in the annular chamber force any material contained therein to the discharge opening 4 into the inner end of the fixed conveyer C.

By means of the foregoing mechanism the traveling conveyer E, with the spindle 16 as a pivot located in the center of the silo floor, can be swung completely around the floor surface, and at the same time rotary motion imparted to the outer end of the shaft 6 of the fixed conveyer C will be transmitted to the shaft 20 of the traveling conveyer E, and also to the spider 28 carrying the scrapers 27 which travels in the shallow receiving trough. The castings B and D form a casing with upper and lower relatively movable members, that incloses the communication between the two conveyers and also protects the mechanism for transmitting motion from the fixed conveyer to the traveling conveyer. The casing also forms a drain for the silage. After the silage has been packed in the silo a considerable quantity of liquid matter settles to the bottom of the receptacle and is collected in the casing, from which it escapes through the pipe P to the exterior of the silo. The housing formed by the back plate 22 and the top plate 23 of the traveling conveyer not only forms a support for the mechanism, but also serves to prevent the imposed material from packing too tightly around the screw 21 as to choke the latter through the weight of the material, for only the edge of the screw projects slightly through the longitudinal opening in the front of the housing.

On the outer end of the traveling conveyer E is mounted the tractor F for driving this conveyer around the floor surface. On the outer end of the back plate 22 (Figs. 3, 4, 5) of the casing of the traveling conveyer, is secured the bracket 29 at right angles to the axis of the conveyer. On the inner face of this bracket is the hub 30 carrying the sleeve 31 in which is journaled the outer end of the shaft 20 of the traveling conveyer. In the front end of the bracket 29 is the sliding pawl 32 normally pressed upward by the spring 33 to engage the teeth of the rack 34 secured to the wall of the silo. The engaging end of the pawl and the teeth of the rack are so shaped that the pawl can move over the teeth in one direction and be held against movement in the opposite direction.

Figures 3, 4, 5, 8, 9:
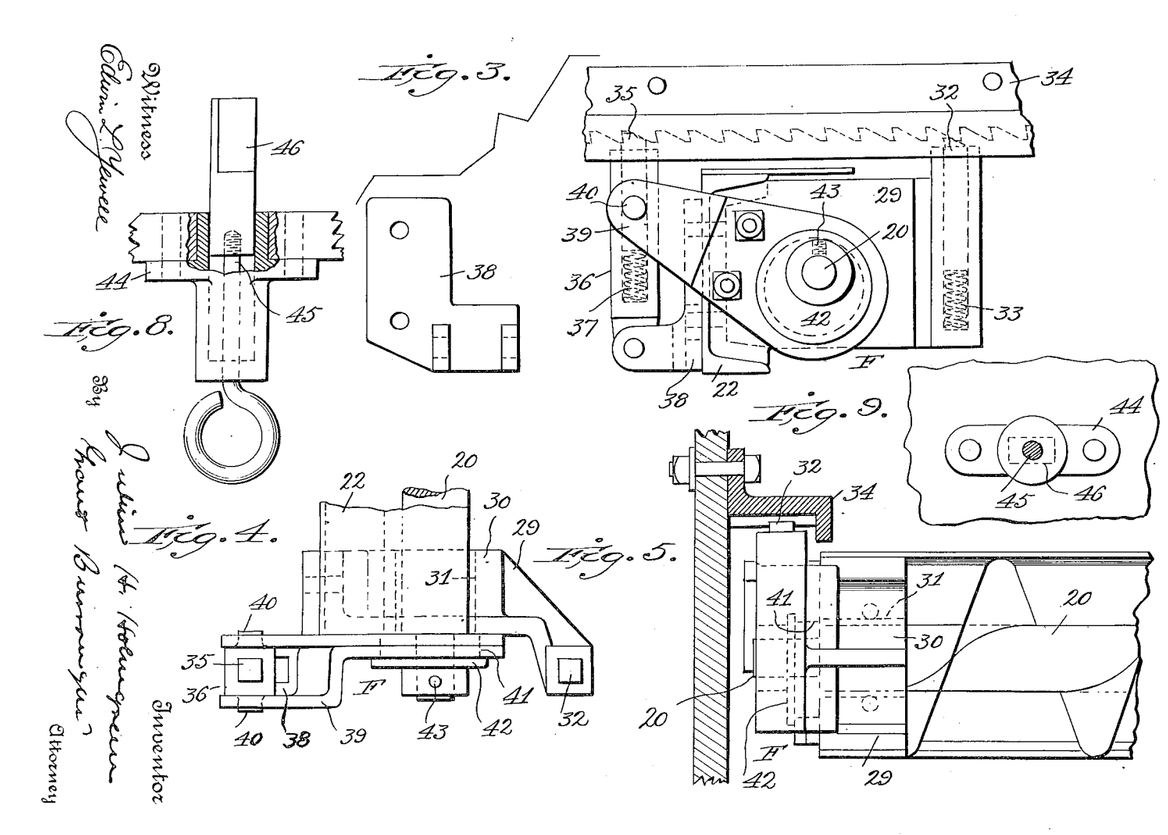
Fig. 3 is an enlarged detailed view showing an end elevation of the traveling conveyer.
Fig. 4 is a plan view of the same.
Fig. 5 is a side elevation of the same.
Figs. 8 and 9 are detailed views, showing the removable tooth of the rack.

Mounted at the rear end of the bracket 29 is another sliding pawl 35 to engage the teeth of the rack 34. The engaging end of this pawl is also shaped so that the pawl can move over the teeth in one direction and be held against movement in the opposite direction. The pawl 35 is carried by the hinged arm 36 and is normally pressed into engagement with the teeth of the rack 34 by the spring 37. The arm 36 is pivoted at its lower end to the plate 38 secured to the back plate 22 of the casing of the conveyer E. The arm 36 carrying the pawl 35 is oscillated by the reciprocative lever 39 formed of two plates secured together and having bearings at one end to engage the trunnions 40 on opposite sides of the arm. The other end of the lever 39 is journaled on the sleeve 41 eccentrically mounted on the shaft 20, said sleeve being integral with the nut 42 secured on the shaft by the set-screw 43. As the shaft 20 is rotated, through its eccentric bearing on said shaft the lever 39 is reciprocated and the arm 36 is thereby oscillated. With the pawl 35 in engagement with one of the teeth of the rack 34, as shown in Fig. 3, and being pressed toward the left, and as the tooth with which the pawl is engaged is immovable, the conveyer E will be moved toward the right as shown in said figure. While the conveyer is being moved toward the right the other pawl 32 slides under the adjacent tooth of the rack 34 and moves into engagement with the face of such tooth. About the time the pawl 32 engages the adjacent tooth the arm 36 completes the movement of the pawl 35 to the left and commences to move it toward the right. During the movement of the pawl 35 to the right the pawl 32 in engagement with the adjacent tooth of the rack holds the conveyer E against movement toward the left. While the conveyer is so held the pawl 35 moving to the right slides over the succeeding tooth and engages the face of the same preparatory to another step in the propulsion of the conveyer to the right. As the rack 34 extends all the way around the wall of the silo, the tractor F will operate to drive the conveyer over the floor surface in a step-by-step movement.

Means are provided for stopping the conveyer E at a predetermined position. At a desirable place in the rack 34 one of the teeth is removable. To accomplish this an opening is made in the wall of the silo and is covered by the socketed plate 44 (Figs. 8, 9). Passing through this plate is the rod 45 carrying on its inner end the tooth 46. In the rack 34 one of the teeth is cut away and is replaced by the movable tooth 46. When the tooth 46 is shoved into place the continuity of the rack remains. When it is desired to stop the traveling conveyer E in the predetermined position, by moving the rod 45 outward the tooth 46 is withdrawn and the continuity of the rack is broken. When the tractor reaches the break in the rack ordinarily the pawl 32, not having a tooth in the rack to engage, will not hold the conveyer E stationary while the pawl 35 is moved forward to the next tooth and, in consequence, the tractor will not force the conveyer forward. It may happen, when the tooth 46 is withdrawn, that the weight of the silage on the conveyer will hold the latter stationary until the pawl 35 is moved to engage the next tooth of the rack, and the propulsion of the conveyer will continue. However, when the pawl 35 reaches the vacancy left in the rack by the withdrawal of the tooth 46, then the propulsion of the conveyer must stop, for there would be no purchase at that point for the pawl to act against to force the conveyer ahead. To start the conveyer again the tooth 46 is shoved back to its place in the rack.

The operation of the extractor as a whole is as follows: The extractor having been installed, the silo is filled with silage in the usual manner. When it is desired to withdraw the silage for feeding purposes, motion is imparted to the extractor by applying power to the pulley 12 on the shaft 8. This immediately puts into operation the fixed conveyer C, the traveling conveyer E, and the tractor F. As the conveyer E travels forward over the floor, the front of its casing or housing being open, the screw 21 projecting slightly in advance of the housing cuts into the silage and forces the displaced material inward into the annular chamber 19 of the casting D and onto the floor of the shallow receiving trough. From the chamber 19 and the receiving trough the material is forced by the scrapers 27 through the opening 4 into the inner end of the fixed conveyer C and is propelled by the screw 7 outward through the tube 5 and discharged into the receptacle 9, from which the material can be taken for feeding purposes. It is to be observed that in the outer end of the tube 5 there is a chamber 11. When a sufficient quantity of the silage has been discharged into the receptacle 9 the doors 10 are closed and the extractor is permitted to make a few additional turns so as to pack the material in the chamber 11 against the doors 10. This packed material forms a plug in the tube 5 that will prevent air from entering through the tube into the silo. Also, as the material of the plug is closely packed, it cannot be materially changed by the little air that might possibly leak past the doors 10.

In the modification shown in Figs. 10 to 16, inclusive, the principal difference from the previous construction is in the traveling conveyer, as in the latter the screw is replaced by an endless belt carrying scraping blades. In the modification, the fixed conveyer C′ is of the same construction as the fixed conveyer C, and operates the same.

Figure 10:
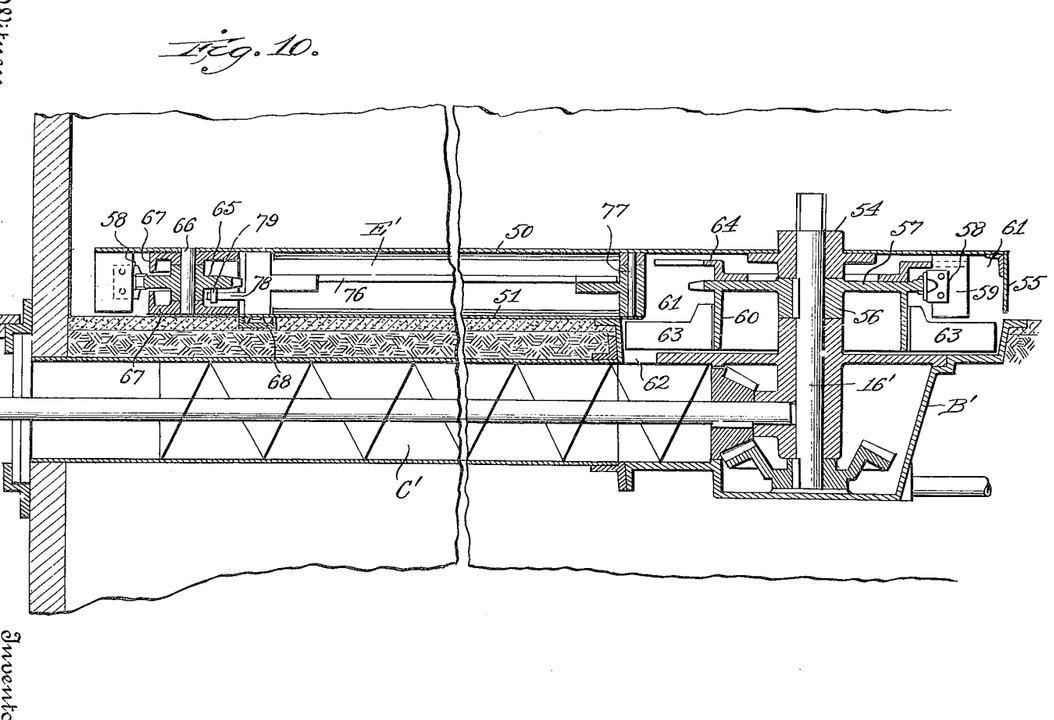
Fig. 10 is a vertical sectional view of a modified form of the extractor.
Figure 11:
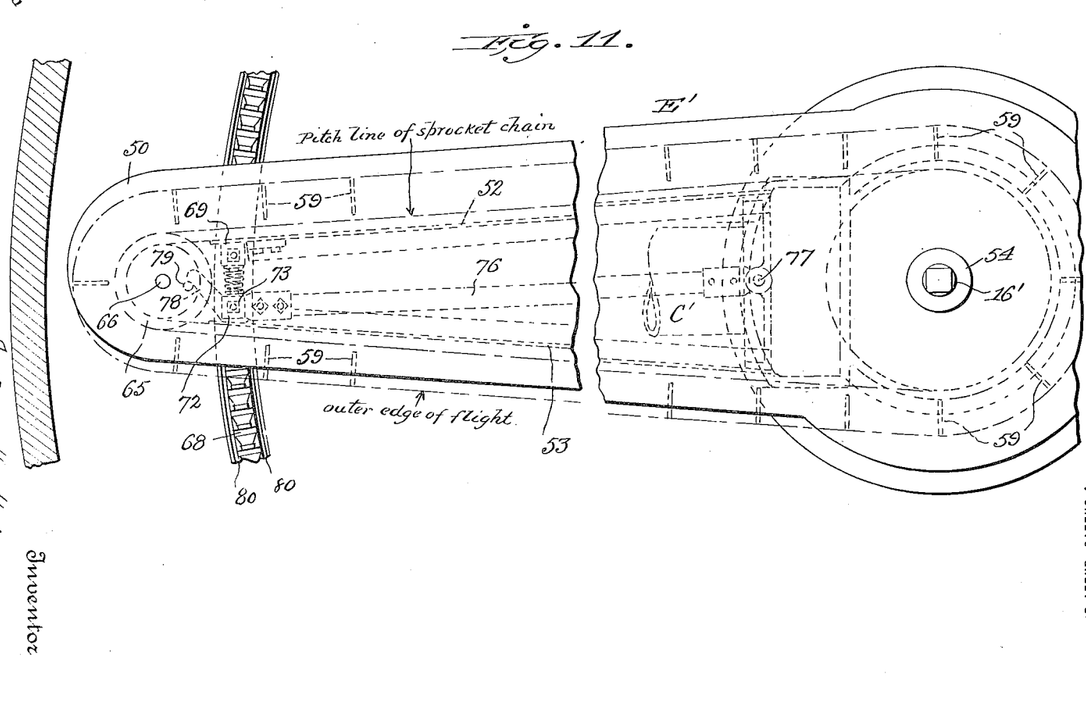
Fig. 11 is a plan view of the same.

In the modification the casing of the traveling conveyer E′ comprises the top plate 50, the bottom plate 51, the front plate 52, and the back plate 53 secured together to present an elongated box-like formation with a guide-way extending around its edge. At its inner end the top plate 50 is secured to the bearing 54 journaled on the spindle 16′. Projecting downwardly from the inner end of the top plate 50 is curved end plate 55 forming the complement to the lower casting B′ of the fixed conveyer C′. Splined on the spindle 16′ below the bearing 54 is the hub 56 of the sprocket-wheel 57 carrying the inner bight of the chain 58 moving in the guide-way extending around the edge of the casing of the traveling conveyer E′. At intervals on this chain are secured the scraping blades 59 that project beyond the front edge of the casing as they move along the guide-way.

Figure 12:
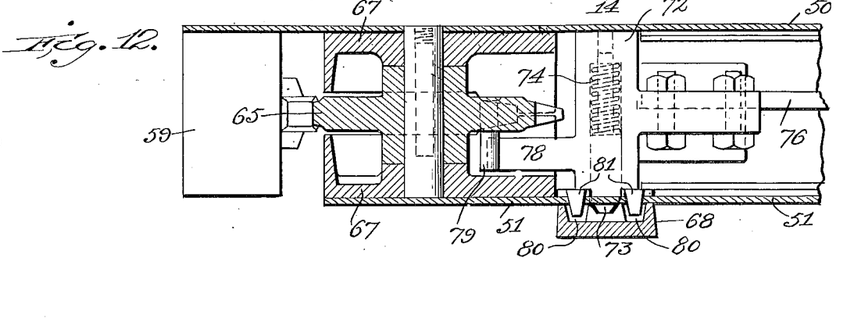
Fig. 12 is an enlarged detailed vertical sectional view of the outer end of the traveling conveyer of the extractor in the modified form.

On the under side of the sprocket-wheel 57 is the downwardly projecting annular flange 60, and between this flange and the curved end plate 55 is the annular chamber 61 in the upper part of which travels the flight of blades 59. This annular chamber communicates through the opening 62 in its base with the inner end of the fixed conveyer C′. Radiating from the periphery of the flange 60 are scrapers 63 that travel around the lower part of the annular chamber 61. These scrapers operate to force the material, brought into the annular chamber by the flight of blades 59, through the opening 62 into the inner end of the fixed conveyer C′. On the upper face of the sprocket-wheel 57 is secured the stripper 64, the arms of which project between the blades 59 as the latter travel around the annular chamber, and operate to clear the material from the blades.

Figure 13:
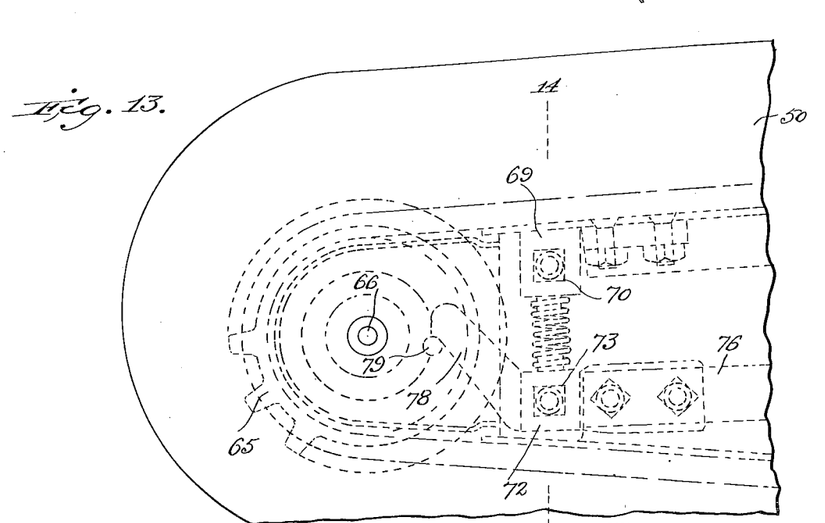
Fig. 13 is a plan view of the same.

In the outer end of the casing of the traveling conveyer E′ is journaled the sprocket-wheel 65 on the shaft 66 between the bearing plates 67. This sprocket-wheel 65 carries the outer bight of the flight chain 58.

Figure 14:
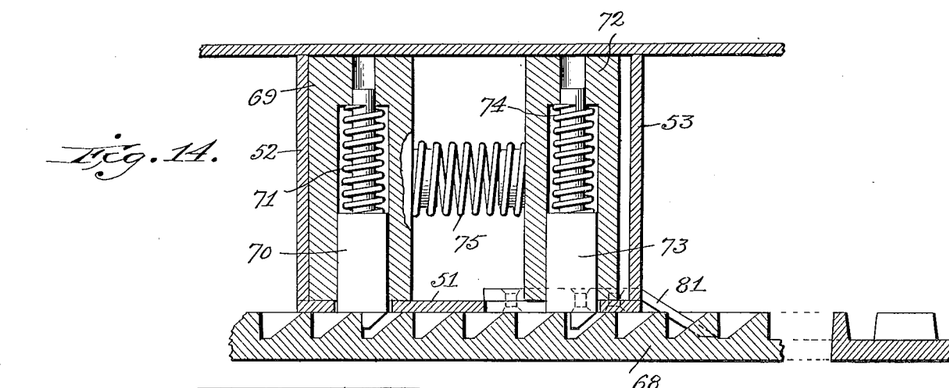
Fig. 14 is a sectional view on the line 14—14 of Fig. 13.
Figure 15:
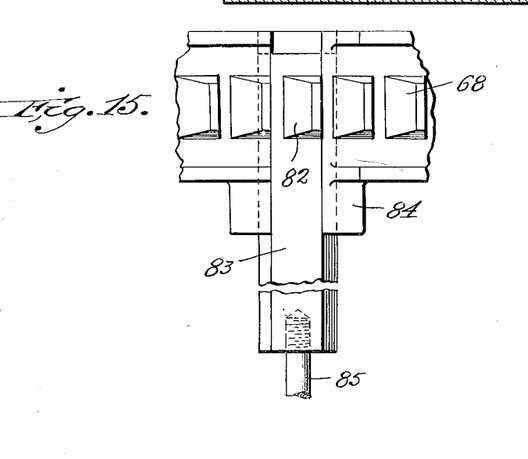
Figs. 15 and 16 are detail views of the removable tooth of the cog-rail in the modified embodiment.
Figure 16:
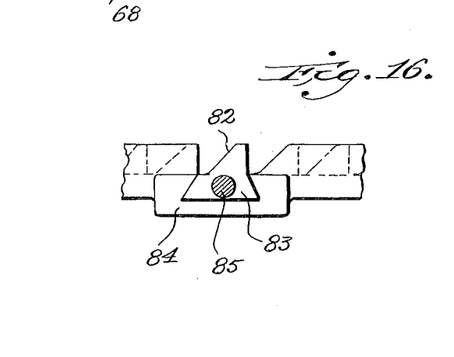

At the outer end of the traveling conveyer E′ is a tractor for propelling the conveyer around the floor of the silo. Embedded in the floor of the silo near its outer edge is the annular cog-rail 68 concentric to the spindle 16′. In a vertical bearing 69 fixed in the conveyer casing is the pawl 70 normally pressed downward by the spring 71 to engage the cog-rail 68. (Fig. 14.) The engaging end of the pawl and the teeth of the cog-rail are so shaped that the pawl will ride over the teeth when moved in one direction, but will be held against movement in the opposite direction.

Adjacent to the fixed vertical bearing 69 is the vertical bearing 72 movably mounted in the conveyer casing and carrying the pawl 73 normally pressed downward by the spring 74 to engage the cog-rail 68. The engaging end of this pawl is also shaped so that it can ride over the teeth of the cog-rail when moved in one direction, but will be held against movement in the opposite direction. A spring 75 compressed between the bearings 69 and 72 normally tends to force the movable bearing 72 away from the fixed bearing 69.

The movable bearing 72 is mounted on the outer end of the arm 76 pivoted at its inner end on the pin 77 at the inner end of the conveyer casing. (Fig 10). On the outer end of the arm 76 is the finger 78 in a position to be engaged by the spur 79 on the under side of the sprocket-wheel 65 driven by the chain 58. With the pawl 73 (Fig. 14) in engagement with one of the teeth of the cog-rail 68, when the spur 79 engages the finger 78 on the arm 76 it tends to move the arm toward the back of the conveyer casing, but the arm cannot move in that direction as it is held by the pawl 73, consequently the conveyer must move forward. This forward movement of the conveyer carries the pawl 70 in the same direction, to the right as shown in Fig. 14, until it engages the next tooth of the cog-rail. This forward movement of the conveyer presses together the vertical bearings 69, 72, and compresses the spring 75 between them. Immediately after the pawl 70 engages the succeeding tooth of the cog-rail the spur 79 releases the finger 78 and frees the arm 76. When the arm is freed, and consequently the bearing 72 carried by it, and as the bearing 69 is held against movement toward the left (Fig. 14) by the engagement of its pawl 70 with the cog-rail, the spring 75 moves the arm and bearing 72 toward the front of the casing, or to the right. This movement of the bearing 72 causes its pawl 73 to engage the next tooth of the cog-rail, in position for another forward movement of the conveyer when the spur 79 again engages the finger 78. In this way a step-by-step forward movement is imparted to the traveling conveyer E' so that it will travel around the floor of the silo.

The cog-rail 68, embedded in the floor of the silo, has its teeth exposed so that the silage can pack between the teeth of the same. Means are provided for clearing the material from the teeth in advance of the traveling conveyer E' so that there will be no impediment to the operation of the pawls 70 and 73. Extending along the sides of the cog-rail are the channels 80 (Figs. 10-14) on opposite sides of the cog-teeth. Traveling in these channels are the plows 81 projecting from the front edge of the casing of the conveyer E'. As the material packed between the cog-teeth projects more or less into the channels, as the plows move along the channels they tend to remove the material from the teeth and clear the latter so that the pawls 70 and 73 can readily engage with the same.

The cog-rail 68 is also provided with a removable tooth 82 (Figs. 15-16) so that the traveling conveyer E' can be stopped at a predetermined point. This tooth is carried by the slide 83 movable back and forth in the guide 84, and at the outer end of the slide is the rod 85 that projects through the wall of the silo. By means of the rod the slide can be moved to displace the tooth from the cog-rail. When the pawl 73 reaches the position of the displaced tooth there will be no engagement of the same to hold the bearing 72, and when the spur 79 next engages the finger 78 of the arm 76, the latter will be moved backward instead of the conveyer E' being moved forward, as would happen with the tooth in place to complete the cog-rail.

The operation of the traveling conveyer in the modified form is the same as in the first instance. Motion from the shaft of the fixed conveyer C' is transmitted through the intermediate gears to the spindle 16' and to the sprocket-wheel 57 splined thereon. This sprocket-wheel drives the endless chain 58 carrying the blades 59 and driving the tractor at the outer end of traveling conveyer E' so that the latter is propelled step-by-step around the floor of the silo, the conveyer pivoting on the spindle 16'. As the conveyer E' travels around the floor the blades 59, that project beyond the front edge of the conveyer casing, eat into the silage that has been packed into the silo and conveys the displaced material into the annular chamber 61. Any material that might cling to the blades in the annular chamber is removed by the stripper 64. The material deposited in the annular chamber 61 is forced by the scrapers 63 through the opening 62 in the floor of the chamber into the inner end of the fixed conveyer C' that carries it to the exterior of the silo. In the modification, as well as in the preferred embodiment of the invention, the silage is kept from exposure to the outside air from the time it is packed into the silo and its discharge from the same.

While the extractor has been particularly described as being applied to silos, yet it can be used in connection with receptacles used in storing other materials which it is desired to remove from the bottom of the mass.

Having thus described my invention, what I claim and desire to secure by Letters-Patent is:

1. In a silo, a receptacle for storing the silage having a floor provided with an approximately central outlet, a conveyer pivoted at its inner end adjacent to the floor outlet, and a tractor mounted on the outer end of said conveyer and operated thereby to propel the conveyer around the receptacle.

2. In a silo, a receptacle for storing the silage having a floor provided with an approximately central outlet, a conveyer pivoted at its inner end adjacent to the floor outlet, a tractor at the outer end of the conveyer, and means upon the vertical walls of the receptacle engaged by the tractor to force the same forwardly.

3. In a silo, a receptacle for storing the silage having a floor provided with an approximately central outlet, a conveyer pivoted at its inner end adjacent to the floor outlet, a tractor at the outer end of the conveyer, and means upon and around the vertical wall of the receptacle engaged by said tractor to force the same forwardly and prevent backward movement thereof.

4. In a silo, a receptacle for storing the silage having a floor provided with an approximately central outlet, a conveyer pivoted at its inner end adjacent to the floor outlet, and a tractor at the outer end of the conveyer and in axial alinement therewith and operated thereby to propel the latter around the floor to engage the bottom layer of the stored material and to conduct it to the floor outlet.

5. In a silo, a receptacle for storing the silage having a floor provided with an approximately central outlet, a conveyer pivoted at its inner end adjacent to the floor outlet, and a reciprocating tractor on the outer end of the conveyer and operated thereby.

6. In a silo, a receptacle for storing the silage having a floor provided with an approximately central outlet, a conveyer pivoted at its inner end adjacent to the floor outlet, said conveyer being a rotating spiral, and a reciprocating tractor on the outer end of the conveyer and operated thereby.

7. In a silo, a receptacle for storing silage having a floor provided with an outlet located at one side only of the center of the floor, a fixed discharging conveyer leading from said outlet beneath the floor to the exterior of said receptacle, a traveling conveyer movable radially over the floor in close proximity thereto, and a housing at the inner end of said traveling conveyer and movable therewith, said housing forming a chamber which is in communication with said outlet at all times, the walls of said housing serving to guide the material from the traveling conveyer to the outlet when said traveling conveyer is out of alinement with the outlet.

8. In a silo, a receptacle for storing silage having a floor provided with an outlet located to one side only of the center of the floor, a traveling conveyer movable to different radial positions over the floor and in close proximity thereto, and a housing at the inner end of said traveling conveyer and movable therewith, said housing forming a chamber which is in communication with said outlet at all times, the walls of said housing extending close to the floor of the receptacle and serving to guide the material from the traveling conveyer to the outlet when said traveling conveyer is out of alinement with the outlet.

9. In a silo, a receptacle for storing the silage having a floor provided with an outlet, a fixed discharging conveyer leading from the outlet beneath the floor to the exterior of the receptacle, a rotatable casing having an annular chamber closed to the receptacle and in constant communication through the floor outlet with the inner end of the fixed conveyer, a rotary means in said annular chamber for forcing the material to said outlet, and a traveling conveyer extending from the rotatable casing and communicating with the annular chamber therein movable over the floor in close proximity to the same for removing the bottom layer of stored material and conducting it to the annular chamber.

10. In a silo, a receptacle for storing the silage having a floor provided with an outlet, a fixed discharging conveyer leading from the outlet to the exterior of the receptacle, a casing having an annular chamber closed to the receptacle and in communication through the floor outlet with the inner end of the fixed conveyer, a rotary means in said annular chamber for forcing the material to said outlet, and a traveling conveyer extending from the casing and communicating with the annular chamber therein movable over the floor in close proximity thereto for removing the bottom layer of stored material and conducting it to the annular chamber.

11. In a silo, a receptacle for storing the silage having a floor provided with an outlet, a fixed discharging conveyer leading from the outlet to the exterior of the receptacle, a casing having an annular chamber in communication through the floor outlet with the inner end of the fixed conveyer, scrapers movable around the annular chamber to propel the contents thereof to the outlet, and a traveling conveyer extending from the casing and communicating with the annular chamber therein movable over the floor in close proximity thereto for removing the bottom layer of stored material and conducting it to the annular chamber.

12. In a silo, a receptacle for storing the silage having a floor provided with an outlet, a fixed discharging conveyer leading form the outlet to the exterior of the receptacle, a rotatable spindle, a casing pivoted on the spindle having an annular chamber in communication through the floor outlet with the inner end of the fixed conveyer, a spider splined on the spindle, scrapers carried by the spider around the annular chamber to propel the contents thereof to the outlet, and a traveling conveyer extending from the pivoted casing and communicating with the annular chamber therein movable over the floor in close proximity thereto for removing the bottom layer of stored material and conducting it to the annular chamber.

13. In a silo, a receptacle for storing silage having a floor provided with an outlet located to one side only of the center of the floor, a traveling conveyer movable to different radial positions over the floor and in close proximity thereto, and a housing at the inner end of said traveling conveyer and movable therewith, said housing forming a chamber which is in communication with said outlet at all times, the walls of said housing serving to guide the material from the traveling conveyer to the outlet when said traveling conveyer is out of alinement with the outlet, and a means within said housing for forcing the material to said outlet.

14. In a silo, a receptacle for storing the silage having a floor provided with an outlet, a traveling conveyer movable around the floor in close proximity thereto, and a tractor contained within the receptacle in horizontal alinement with and actuated directly by the conveyer for moving the latter around the floor.

15. In a silo, a receptacle for storing the silage having a floor provided with an outlet, a traveling conveyer movable around the floor in close proximity thereto, means for transmitting motion from the exterior of the silo to the conveyer, and a tractor contained within the receptacle in horizontal alinement with and actuated directly by the conveyer for moving the latter around the floor.

16. In a silo, a receptacle for storing the silage having a floor provided with an approximately central outlet, a traveling conveyer pivoted at its inner end adjacent to the floor outlet for removing the bottom layer of stored material to said outlet, means for transmitting motion from the exterior of the receptacle to the inner end of the conveyer, and a tractor mounted on the outer end of the conveyer and actuated by the same for propelling the conveyer around its pivot over the floor.

17. In a silo, a receptacle for storing the silage having a floor provided with a central shallow receiving trough provided with an outlet opening at one side, a conveyer pivoted at its inner end to travel over said floor to feed material to said trough, and means in said trough for forcing the material therein to said outlet opening.

18. In a silo, a receptacle for storing the silage having a floor provided with an approximately central discharge outlet, an elongated casing with an open front pivoted at its inner end adjacent to the discharge outlet, a conveyer mounted in the casing and projecting through the open front to engage the stored material to propel it to the inner end of the casing into the discharge outlet, and a tractor mounted on the outer end of the longitudinal casing and actuated by the conveyer to propel the casing around its pivot over the floor.

19. In a silo, a receptacle for storing the silage having a floor provided with an approximately central discharge outlet, a conveyer pivoted at its inner end adjacent to the discharge outlet, a rack concentric to the conveyer's pivot and adjacent to the path of travel of the outer end of the conveyer, a holding pawl on the outer end of the conveyer to engage the rack to hold the conveyer against backward movement, and an oscillative pawl actuated by the conveyer to engage successive teeth of the rack to propel the conveyer forward around its pivot over the floor to engage the bottom layer of stored material to conduct it to the discharge outlet.

20. In a silo, a receptacle for storing the silage having a floor provided with an approximately central discharge outlet, a conveyer pivoted at its inner end adjacent to the discharge outlet and having a rotatable member at its outer end, a rack concentric to the conveyer's pivot and adjacent to the path of travel of the outer end of the conveyer, a fixed bearing at the outer end of the conveyer, a spring-pressed pawl in the fixed bearing operating to engage the rack to hold the conveyer against backward movement, a pivoted bearing on the outer end of the conveyer, a spring-pressed pawl in the pivoted bearing to engage the rack, a cam on the rotatable member of the conveyer, and an arm actuated by the cam to oscillate the pivoted bearing to cause the pawl carried thereby to successively engage the teeth of the rack to propel the conveyer forward around its pivot to engage the bottom layer of material to conduct it to the discharge outlet.

21. In a silo, a receptacle for storing the silage having a closed lower part except a discharge outlet, means for forcing the material from the interior of the receptacle through the discharge outlet, a conveyer having a closed conduit leading from the discharge outlet to the exterior of the receptacle, said conduit having a chamber at its outer end, and means for closing the outer end of the chamber so that the material will be packed by the conveyer in the chamber to seal the conduit to the outside air.

22. In a silo, a receptacle for storing the silage having a floor provided with an approximately central outlet, a conveyer pivoted at its inner end adjacent to the floor outlet, and a tractor carried by and operated by said conveyer and lying in the same horizontal plane therewith.

In testimony whereof I hereunto affix my signature in the presence of two witnesses.

JULIUS H. HOLMGREEN.

Witnesses:
R. J. HOLMGREEN,
EDGAR H. TRICK.